March 12, 1957 G. M. KIRKPATRICK 2,784,909

ELECTRONIC MULTIPLIER

Filed Nov. 25, 1952 2 Sheets-Sheet 1

Inventor:
George M. Kirkpatrick,
by Merton D. Moore
His Attorney.

March 12, 1957 G. M. KIRKPATRICK 2,784,909

ELECTRONIC MULTIPLIER

Filed Nov. 25, 1952 2 Sheets-Sheet 2

Inventor:
George M. Kirkpatrick,
by Merton D. Moore
His Attorney.

United States Patent Office 2,784,909

Patented Mar. 12, 1957

2,784,909

ELECTRONIC MULTIPLIER

George M. Kirkpatrick, Syracuse, N. Y., assignor to General Electric Company, a corporation of New York Application November 25, 1952, Serial No. 322,422

6 Claims. (Cl. 235—61)

My invention relates to electronic multiplier circuits, and more particularly to such circuits that employ carrier waveforms for the purpose of deriving a voltage corresponding to the product of the two independent voltages.

Carrier-type multipliers are known, one of which operates on a train of rectangular pulses so as to amplitude modulate the pulses by one input voltage and to width modulate the pulses by the other input voltage. The product of the input voltages is derived by short-time integration of the double-modulated carrier. This type of multiplier, although for some purposes is very satisfactory, requires elaborate equipment including many pulse-shaping circuits as well as an integrator.

Another type of carrier multiplier combines modulated carriers in a precision square-law device, which, while it is capable of handling a wide range of frequencies, requires a special tube having an internal parabolic screen and complex circuitry, adding considerably to the cost.

It is, accordingly, a principal object of this invention to provide a novel and improved carrier-type multiplier device that is relatively simple in construction, requiring no special components or complicated apparatus, and which, at the same time, yields reliably accurate results over a useful range of operating frequencies.

Another object of this invention is to provide a carrier-type multiplier device in which a difficulty inherent in prior-known devices is obviated which difficulty results from the necessity of providing a dynamic range within the multiplier equal to the product of the dynamic ranges of the individual input voltages to be multiplied. This difficulty is overcome in the apparatus of the invention by the use of double modulation of a carrier.

Briefly stated, in accordance with one aspect of my invention, I eliminate the above-noted disadvantages of the prior-known carrier-type multipliers by the employment of a combination of a frequency modulator and an amplitude modulator, the former modulating the frequency of the carrier in accordance with the first input voltage and the latter amplitude modulating the carrier in accordance with the second input voltage, the combined frequency and amplitude modulated carrier being applied to a frequency-sensitive discriminator of which the output corresponds to the derived product of the input voltages.

For multiplication by factors having either plus or minus signs, I provide a novel FM—AM multiplier arrangement in which a unidirectional bias potential is superimposed on the multiplier input to the amplitude modulator, and arrangements are provided to cancel the said bias potential from the product term, thereby to provide a resultant product of the proper magnitude and sign.

It is, therefore, another object of this invention to provide an electronic multiplier having means to frequency modulate a carrier in accordance with a modulation voltage corresponding to a first factor, means to amplitude modulate the frequency-modulated carrier in accordance with a modulation voltage corresponding to a second factor, said first and said second factors each being capable of plus or minus values, the multiplier further including means to impress a unidirectional bias voltage on the modulation voltage corresponding to one said factor, thereby to permit amplitude modulation of said frequency-modulated carrier in either sense relative to said unidirectional bias voltage, and means including a cancellation network for deriving a voltage proportional to the product of said factor.

The features of my invention which I believe to be novel are set forth with particularity in the appended claims. My invention itself, however, both as to its organization and method of operation, together with further objects and advantages thereof, may best be understood in reference to the following description, in which Fig. 1 is a block diagram illustrative of a multiplier embodying the principles of my invention;

Figure 1:
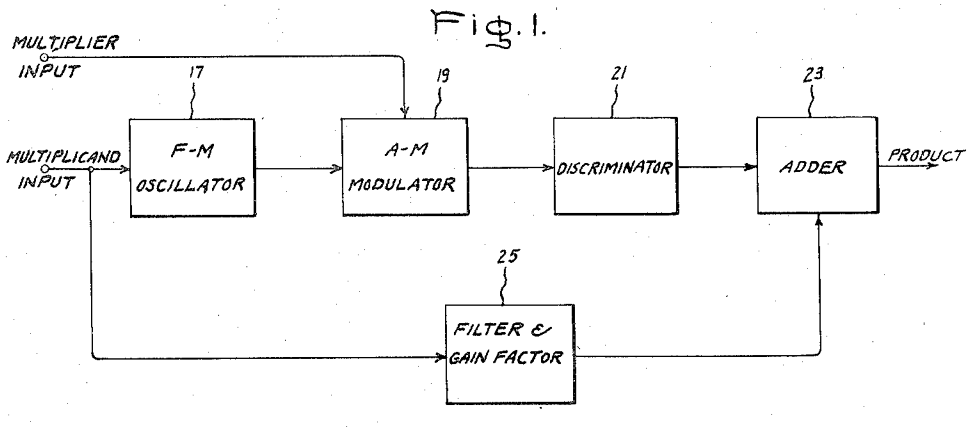
Figure 2:
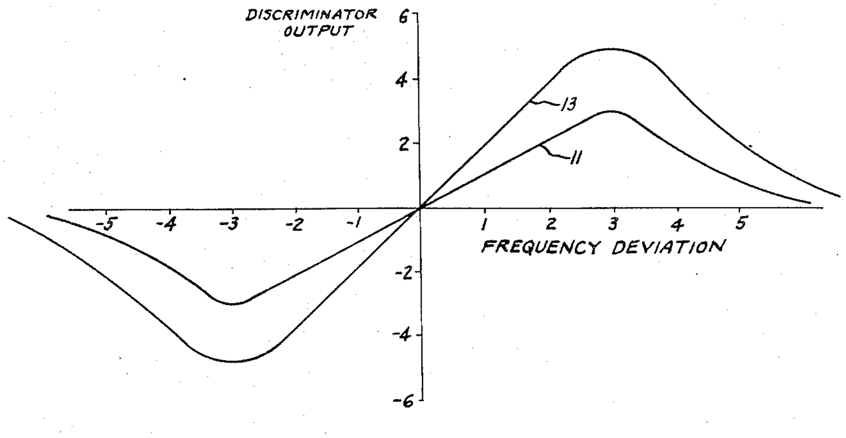
Fig. 2 is a graph useful in explanation of the operation of the multiplier illustrated in Fig. 1.

Referring now to the drawing, an FM—AM multiplier is shown in block diagrammatic form in Fig. 1, which is capable of providing a product of two quantities $x$ and $y$, both of which can be algebraic quantities of either positive or negative sign. The underlying basis of the multiplier is found in the response characteristic of a frequency-sensitive discriminator. A pair of such characteristics for two different carrier amplitudes are shown in Fig. 2 at 11 and 13, which are graphs plotted with the output of the discriminator as ordinates and the deviation of the frequency of the carrier from a mean frequency value as abscissas.

The discriminator characteristics are substantially linear over predetermined portions thereof, say between values of the frequency deviation from −2 through +2. Throughout these linear portions, the output of the discriminator is proportional both to the frequency deviation and to the amplitude. Hence, the discriminator output is equal to the product of the frequency deviation, the amplitude, and a proportionality constant, the latter being a function of the apparatus employed. Thus the requirements of a multiplier are satisfied.

Returning now to the block diagram of Fig. 1, the multiplier is shown comprising a frequency-modulation oscillator unit 17, which may comprise a radio-frequency oscillator of any suitable conventional type having the usual frequency-determining element, such for example as a reactance-tube modulator, for controlling the excursions or deviations of the frequency of the oscillator output relative to the natural frequency of operation thereof. A voltage input corresponding to the instantaneous value of a multiplicand factor, here designated by the quantity $\pm x$ to indicate that the multiplicand can be of either positive or negative sign, is applied to the frequency-determining element to control the instantaneous frequency of the output of the oscillator unit 17.

The output of the oscillator unit 17 is of the form $$A_0 \sin (w_0 \pm K_F x)t \qquad \text{(I)}$$

where $A_0$ is the amplitude of the oscillator output, $w_0$ is proportional to the natural frequency of the oscillator 17, $K_F$ is the frequency-modulation constant, $x$ is the input signal strength, and $t$ is the time.

The output of oscillator unit 17, after suitable limiting of the amplitude thereof, is required, is fed to an amplitude modulator 19 of any suitable conventional type such as a vacuum-tube device arranged for screen-grid modulation, to which is also applied a voltage $y$, which corresponds to the multiplier factor. The output of the amplitude modulator 19 is of the form $$A_0K_Ay\sin(w_0\pm K_Fx)t \quad \text{(II)}$$

where $A_0$, $K_F$, $x$, $y$, $w_0$ and $t$ are defined as above, and $K_A$ is the amplitude-modulation constant.

The output of the amplitude modulator 19 is then applied to a frequency-sensitive discriminator 21, which can be of the well-known Foster-Seeley or any other suitable type known in the art, and the output thereof, as noted hereinabove, is proportional to the product of the multiplicand $x$ and the multiplier $y$, or $$A_0K_DK_Ay(\pm K_Fx) \quad \text{(III)}$$

where $K_D$ is a constant that is characteristic of the discriminator 21.

As thus far described, the multiplier apparatus is capable of operation with multiplier voltages of only a single polarity applied to the input of the amplitude modulator 19. For operation with multiplier voltages of either positive or negative polarity, corresponding respectively to algebraic multiplier terms of either sign, a predetermined unidirectional bias can be added to the multiplier input voltage and subsequently cancelling or subtracting the resultant discriminator output voltage from the bias. Thus, if $y_1$ is the unidirectional bias added to a multiplier input voltage $\pm y_2$, $y$, the total input applied to the amplitude modulator 19 is $$y_1\pm y_2 \quad \text{(IV)}$$

With an input voltage applied to the modulator of the form given by Equation IV, the output of the discriminator takes the form $$A_0K_DK_AK_F(y_1\pm y_2)(\pm x) \quad \text{(V)}$$

and this voltage is applied to an adder circuit 23 to which is also fed a voltage delivered by a branched path or circuit including a filter and gain factor circuit 25, which is responsive to the multiplicand voltage $\pm x$ to provide an output of the form $$-A_0K_DK_AK_F(\pm y_1)(\pm x) \quad \text{(VI)}$$

The algebraic sum or resultant voltage derived from the adder 23 is the required product $$A_0K_DK_AK_F(\pm y_2)(\pm x) \quad \text{(VII)}$$

which, it will be observed, is dependent on the polarity of both the multiplicand and the multiplier.

The principal requirements imposed on the multiplier apparatus are good linearity of the frequency modulator and the discriminator, and further, that the bipolar input $\pm y_2$ not exceed the unidirectional bias $y_1$ in the negative sense although it may in the positive sense.

Figure 3:
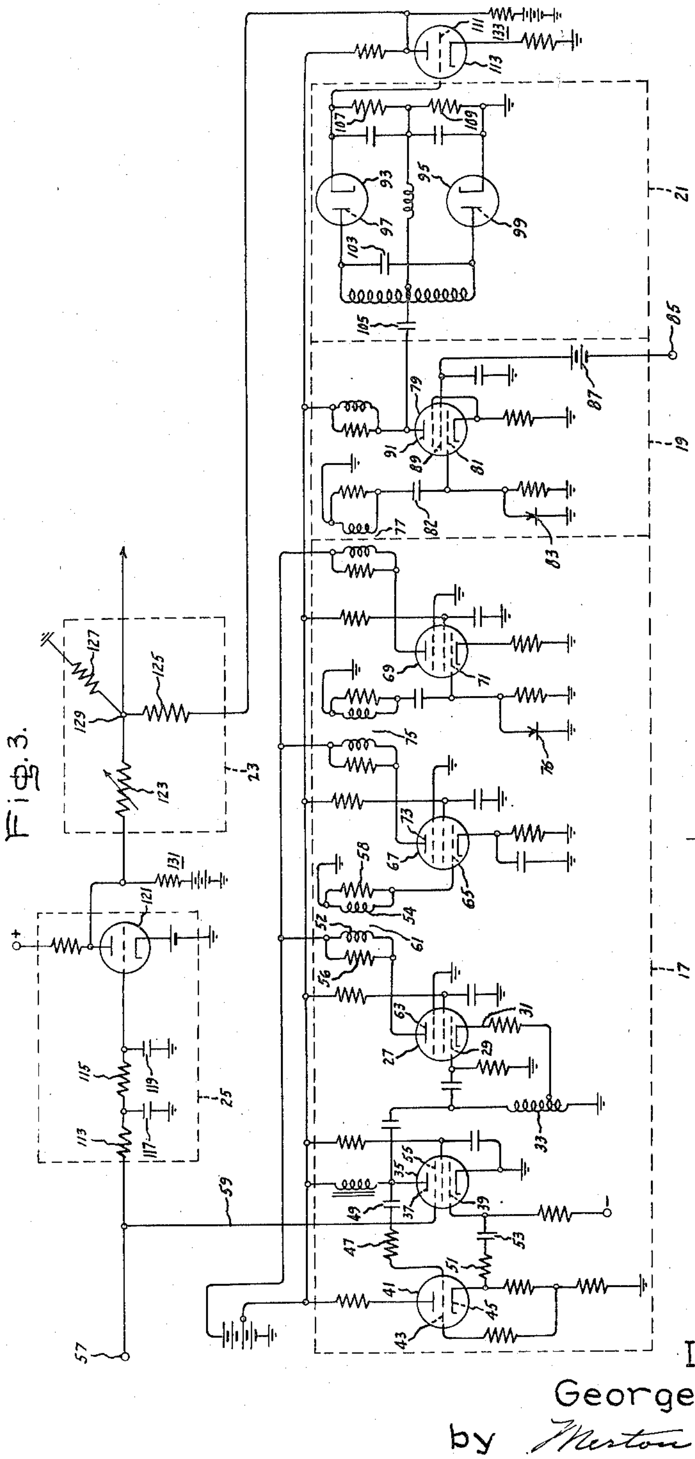
Fig. 3 is a schematic wiring diagram of the circuits utilized in the illustrative embodiment of the invention.

Fig. 3 is a schematic wiring diagram of the circuits employed in the illustrative embodiment of the multiplier apparatus of this invention. As shown, the frequency-modulation oscillator unit 17 comprises an oscillator, which may be of any conventional type such as the well-known Hartley oscillator including an electron-discharge tube device 27 of which the grid-cathode circuit 29, 31 includes a coil 33 that forms the inductive part of the frequency-determining element of the oscillator. The capacitative part of the frequency-determining element is provided by the output capacity of vacuum tube device 35 and input capacity as is well-known, of vacuum tube device 27. The reactance tube modulator may be in the form of a vacuum-tube device 35 of which the plate and control grid electrodes 37 and 39, respectively, are maintained in quadrature phase relation by means of a phase shifter, which in the illustrative embodiment comprises a vacuum-tube phase shifter 41.

The phase-shifter can be any suitable triode device having a grid 43 and cathode 45, the grid 43 being connected through a resistor 47 and an isolation capacitance 49 to the plate 37 of the reactance tube 35 while the cathode 45 is similarly connected through a resistor 51 and an isolation capacitance 53 to the grid electrode 39 of the reactance tube 35. The resistors 47 and 51 are of suitable magnitude such that the series connection of the former and the stray capacitance between grid 43 to ground provides a phase shift of 45°, while the series connection of the resistor 51 and the input capacitance of the grid 39 to ground provides a phase shift of 45°, thereby to establish the quadrature phase relation between the plate 37 and grid 39 of the reactance modulator 35. The usual plate-voltage supplies, biasing and by-pass elements are of course provided to energize these circuits and these elements are thought to be sufficiently well understood by those skilled in the art to obviate the need for further description.

The quadrature phase relation between the plate 37 and the grid 39 operates to provide lagging current through the device 30 so that the output impedance of the device 35 appears as an inductive reactance which together with the inductive reactance of the coil 33 and the circuit capacity determine the natural frequency of operation of the ocillator 27.

Control of the frequency deviations or excursions of the oscillator 27 by positive or negative voltages corresponding to the multiplicand factor $x$ is effected by the application of such voltages to the suppressor grid 55 of the reactance tube 35, which as shown, is connected to a multiplicand voltage input terminal 57 by means of conductor 59. The frequency-modulated output of the oscillator 27 is coupled to the input of an amplifier stage by means of an interstage transformer coupling arrangement 61 coupling the plate 63 of the oscillator 27 to the control electrode 65 of a suitable amplifier device 67 of any conventional type. The windings 52 and 54 of the transformer 61, are respectively paralled by resistors 56, 58 for increasing the band-width of the coupling. Similar transformer coupling arrangements are employed throughout the oscillator unit 17 and the amplitude modulator 19, as will appear.

After amplifying the frequency-modulated carrier, by means of the amplifier 67, to a level suitable for limiting action, the amplitude of the frequency-modulated carrier is limited in an amplitude-limiter stage, which can be in the form of an overdriven vacuum-tube device 69 of which the control grid 71 is coupled to the plate 73 of the amplifier 67 through an interstage coupling transformer 75 of a type similar to that described above. Although the operation of the amplifier and limiter stages 67 and 69, respectively, are well understood, and a full description here is deemed to be unnecessary, it is desirable to note that improved limiting action is obtained by the provision of a rectifier which, as shown, is connected between the grid 71 and the ground and poled to conduct on positive half-cycles of the amplified frequency-modulated input. The conduction through the rectifier 75, it has been found, prevents the grid from going too far positive, thus maintaining the amplitude of the output more nearly constant.

The substantially constant-amplitude output of the limiter 69 is then applied, through an interstage coupling transformer 77, to the amplitude modulator 19, which may comprise a pentode device 79 having a control grid 81 to which the limiter output is applied through a coupling condenser 82. The modulator 79 may also be provided with a rectifier 83 for improving the limiting action of this stage. The modulator 79 is desirably operated for screen-grid modulation and to that end, the bi-polar multiplier voltage is applied at a multiplier voltage input terminal 85 that is connected through a suitable source of unidirectional bias voltage, here shown conventionally as a battery 87, to the screen grid electrode 89.

Figure 4:
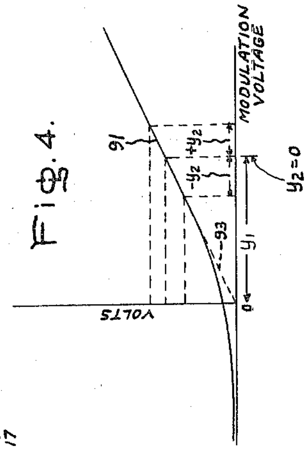
Fig. 4 is a graph explanatory of the operation of the amplitude-modulator portion of the multiplier.

As is well known, the operating characteristic of a screen-grid amplitude modulator of the type presently described is generally of the form illustrated by the curve 91, of Fig. 4, which is plotted with modulation voltage input as abscissas and voltage output as ordinates. For ideal conditions of amplitude-modulator operation, the characteristic curve 91 desirably passes through the origin as shown by the dotted portion 93.

One desirable effect of the unidirectional voltage supplied by the bias battery 87 is to shift the operating point of the modulator to a region well in the linear portion of the characteristic 91, which as noted above, is a desirable condition for operation of the multiplier of this invention. Also, as noted, the application of the unidirectional bias voltage enables multiplication of positive and negative factors since the application of voltages at terminal 85 of either polarity is effective to provide a modulated output derivable from the linear modulation characteristic. Thus, in the graph of Fig. 4, the abscissa $y_1$ represents the magnitude of unidirectional bias voltage supplied by battery 87 and also the multiplier voltage when $y_2=0$. Positive values of $y_2$ are thus taken in the direction of increasing modulation voltages and negative values of $y_2$ are taken in the direction of decreasing modulation voltages, as shown.

The output voltage appearing at the anode 91 of the modulator 79 is thus a frequency-modulated, amplitude-modulated carrier voltage of which the frequency excursion is proportional to the magnitude of the multiplicand voltage input *x* and the amplitude is proportional to the magnitude of the multiplier voltage input *y*. This double-modulated carrier is detected in a suitable frequency-sensitive circuit, here shown as the discriminator 21, which can be of the conventional Foster-Seeley type having a pair of rectifiers in the form of diodes 93 and 95 of which the plates 97, 99, respectively are connected through a suitable coil 101. A condenser 103 tunes the coil to the center frequency of the frequency-modulated carrier, as is well-known. The output of the amplitude modulator 79 is coupled to the midpoint of the coil 101 through a condenser 105, which, together with the output impedance of the modulator 79, also provide a circuit tuned to the center frequency. The discriminator output is derived across the output resistors 107, 109 and is applied to the input electrode 111 of conventional inverter stage consisting of a single-stage amplifier device 113.

As described hereinabove, cancellation of the unidirectional bias voltage is effected by combining the discriminator output and inversion of the multiplicand voltage *x* after the latter has been passed through a bias-voltage cancellation channel comprising filter network having a characteristic such that the output thereof has the same amplitude and phase relative to frequency as the output delivered by the discriminator 21. Such a filter is here shown in the dotted rectangle 25 and can consist of a network of series-connected resistors 113, 115 and shunt capacitors 117, 119 suitably selected to provide the desired characteristics.

The filter output is fed through an inverter stage in the form of a vacuum-tube amplifier device 121 to the adder circuit 23 comprising, in the illustrated embodiment, a Y-connection of resistors 123, 125 and 127 having a common junction 129. The output of the filter channel is connected to the resistor 123 of the adder 23 and the output of the discriminator channel is connected to resistor 125 of the adder. The connections of the respective outputs of the filter and discriminator channels are desirably accomplished by direct coupling to permit multiplication by slowly changing quantities as well as by pulses. To maintain the outputs at ground potential from zero inputs thereto, biasing arrangements as at 131 and 133 can be employed.

The resistor 123 can be employed as a calibration control and is, accordingly, adjustable so that the magnitude thereof can be so selected that for a zero value of the multiplier input, the amplitude of the voltage in the filter channel is equal to and of opposite polarity relative to the voltage in the discriminator channel. The resistor 125 is desirably of substantially the same magnitude as the resistor 123 while the resistor 127 is of considerably smaller magnitude than either of the resistors 123 or 125. Then, if the overall gain of the filter channel and that of the discriminator channel are suitably adjusted, an output is derived at the junction 129 that is proportional to the desired product of the multiplier and multiplicand voltages, in accordance with the Formula VII given hereinabove.

It will be clearly understood that where multiplication by factors of only one sign is required or desired, requiring then the application at the terminal 85 of voltage of only a single polarity, the bias supply 87 can be omitted and the filter-cancellation channel can, accordingly, also be omitted.

It will be understood that while I have here shown a frequency-modulation oscillator of the Hartley type controlled by a reactance-tube device, other suitable oscillators may be employed without departing from the spirit of this invention. Similarly, the discriminator circuit, the filter network and the adder circuit, can each be replaced by suitable conventional circuits for the similar purposes without affecting the essential mode of operation of my multiplier.

While the present invention has been described by reference to a particular embodiment thereof, it will be understood that modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. An electronic multiplying apparatus, comprising means to provide a frequency-modulated wave having frequency excursions corresponding to a multiplicand factor, means jointly responsive to said frequency-modulated wave and a multiplier factor to provide a double-modulated wave having a frequency modulation component corresponding to said multiplicand factor and an amplitude modulation component corresponding to said multiplier factor, and means responsive to said double-modulated wave to provide an output voltage having a characteristic corresponding to the product of said multiplicand and multiplier factors.

2. An electronic multiplying apparatus, comprising a carrier-wave oscillator adapted to provide a frequency-modulated wave having frequency excursions corresponding to a multiplicand factor, amplitude-modulation means jointly responsive to said frequency-modulated wave and a multiplier factor to provide a double-modulated wave having a frequency modulation component corresponding to said multiplicand factor and an amplitude modulation component corresponding to said multiplier factor, and discriminator means responsive to said double-modulated wave to provide an output voltage having a characteristic corresponding to the product of said multiplicand and multiplier factors.

3. An electronic multiplying apparatus, comprising a carrier-wave oscillator having a frequency-determining element, means to apply to said element a potential characteristic of a multiplicand to cause said oscillator to provide a frequency-modulated wave having frequency deviations corresponding to said multiplicand, means to provide a potential characteristic of a multiplier, amplitude-modulation means jointly responsive to said frequency-modulated wave and said multiplier potential to provide a resultant wave having a frequency modulation corresponding to said multiplicand potential and an amplitude modulation corresponding to said multiplier potential, and means responsive to said resultant wave to provide an output voltage having a characteristic corresponding to the product of said multiplicand and multiplier potentials.

4. Electronic multiplying apparatus, comprising radio-frequency oscillator means having a frequency-determining element responsive to an input potential characteristic of a multiplicand for producing a frequency-modulated output wave having a frequency deviation relative to the natural frequency of said oscillator corresponding to said multiplicand, amplitude modulation means having an input terminal to receive a potential characteristic of a multiplier, said multplier potential having a polarity corresponding to the algebraic sign of said multiplier, means in series with said input terminal to superimpose a unidirectional bias on said multipler potental, said amplitude-modulation means being responsive to said frequency-modulated wave and said biased multiplier potential to provide a double-modulated wave having a frequency modulation component corresponding to said multiplicand potential and an amplitude modulation corresponding to said biased multiplier potential, frequency-sensitive means responsive to said double-modulated wave to provide an output voltage having a characteristic corresponding to the product of said multiplicand and biased multiplier potentials, and means to diminish said output voltage an amount corresponding to said bias thereby to provide a resultant wave proportional to the product of said multiplicand and multiplier potentials.

5. An electronic multiplier, comprising means to generate a carrier wave, means to frequency modulate said carrier wave in accordance with a modulation voltage corresponding to a first factor, means to amplitude modulate the frequency-modulated carrier in accordance with a modulation voltage corresponding to a second factor, at least one of said factors being characterized by plus or minus values, means to impress a unidirectional bias voltage on the modulation voltage corresponding to said one factor, whereby amplitude modulation of said frequency-modulated wave is available in either of two senses relative to said bias voltage, and frequency-sensitive means responsive to the output of said amplitude-modulating means to provide an output voltage having a characteristic proportional to the product of said first and second factors.

6. An electronic multiplier comprising, means to generate a carrier wave, means to frequency modulate said carrier wave in accordance with a modulation voltage corresponding to a first factor, amplitude-limiting means coupled to said frequency-modulating means for limiting the amplitude of said frequency-modulated wave to a predetermined value, means to amplitude modulate the amplitude-limited frequency-modulated carrier in accordance with a modulation voltage corresponding to a second factor, at least one of said factors being characterized by plus or minus values, means to impress a unidirectional bias voltage on the modulation voltage corresponding to said one factor, whereby amplitude modulation of said frequency-modulated wave is available in each of two senses relative to said bias voltage, frequency-sensitive means responsive to the output of said amplitude-modulating means to provide an output voltage having a characteristic proportional to the product of said first and second factors and said bias voltage, and means to diminish the magnituae of said output voltage an amount corresponding to said bias voltage.

References Cited in the file of this patent

Price "An FM–AM Multiplier of High Accuracy and Wide Range," Technical Report No. 213, MIT, October 4, 1951, pages 1–15.